Aug. 9, 1927. Re. 16,696

C. F. HEYWOOD

MEANS FOR STARTING INTERNAL COMBUSTION ENGINES

Original Filed Aug. 27, 1921

Inventor

Charles Frederick Heywood,

By

Attorneys

Reissued Aug. 9, 1927. Re. 16,696

UNITED STATES PATENT OFFICE.

CHARLES FREDERICK HEYWOOD, OF DETROIT, MICHIGAN.

MEANS FOR STARTING INTERNAL-COMBUSTION ENGINES.

Original No. 1,481,091, dated January 15, 1924, Serial No. 495,916, filed August 27, 1921. Application for reissue filed January 11, 1926, Serial No. 80,682. Divided and this application for reissue filed June 14, 1927. Serial No. 198,237. (Original patent granted under the provisions of the act of March 3, 1921, 41 Stat. L., 1313.)

DIVISION B.

This invention relates to the starting of multicylinder internal combustion engines with the aid of fluid under pressure having a combustible content and admitted under the control of distributing means.

The subject-matter of the present application is included within and forms a part of the disclosure of the United States Patent granted to me January 15, 1924, No. 1,481,091. Upon the presentation of an application for re-issue of the said patent, a requirement for division of claims was made as between the claims for the structure disclosed in the present application and those directed to the remaining forms shown in the patent and the re-issue application therefor; the requirement was met, and the present application is presented as a divisional application of such re-issue application, the latter having been filed January 11, 1926, Serial No. 80,682.

While the present application is limited to but one of the forms of the invention, and the detailed disclosure of the invention is restricted to such particular form, a brief reference is made to the broader invention as disclosed in the said patent and in the application above identified, in order that a clearer understanding will be had of the fundamentals of the present invention.

The invention, fundamentally, is based upon the delivery of a fluid under pressure to the cylinder undergoing its working stroke, and a lesser quantity of fluid having a combustible content to the cylinder next in firing order, thus placing a combustible charge within the cylinder, then on its compression stroke, which becomes the working cylinder in the development of the firing cycle of the engine. The broad invention does not contemplate the delivery of a charge of this nature only to the compression cylinder, since the delivery of a charge of similar nature but of still less volume, can be provided also to the cylinder then undergoing the suction stroke of the cycle, as an alternative form; in either case, however, the delivery of the charge to the compression cylinder, is a controlling and essential feature.

While the broad invention can be made manifest in different ways, as indicated in the disclosure of my said patent, a preferred way is by the use of a simple form of rotating distributing valve, the rotation of which serves to control the admission of the fluid to the cylinders individually, this being done by the use of individual conduits or passages connecting each of the cylinders with a member, the latter carrying entrance ports which are controlled by the movement of the distributing valve, each conduit or passage having an automatic check valve which closes the conduit to the fluid pressure during periods when the pressure in the cylinder is in excess of that of the fluid pressure.

Where the charge delivery is to the compression cylinder alone, it is possible to utilize compressed air as the fluid for the working cylinder, and at the same time use such air as a means for introducing the fuel component for the charge into the air for the charge without affecting the main portion of the air supply (which may be in the form of a chamber within which the distributing valve is active), as indicated in such patent. However, where the valve is to deliver a charge additionally to the suction cylinder, the ability to maintain this distinction between the carburetted and non-carburetted air is more difficult, and hence it is preferred to utilize the simple type of rotating distributing valve and to break down this air distinction, by employing the carburetted type of air for all cylinders; as a result, the air for the working cylinder has the combustible charge characteristic, but as it is being introduced at a time when, in the general practice of the cycle, the firing activity has been completed, the charge within the working cylinder is not exploded, but acts expansively because of its pressure characteristic, and is discharged as a part of the exhaust at the proper time; should such charge be exploded, however, such action can serve to start the engine, since the dead center position of the piston has been passed prior to the introduction of the charge within the working cylinder. The use of the combustible air for all cylinders can, of course, be employed where the valve is to deliver only to the compression and working cylinders, but the separate air characteristic above referred to is preferred under such condition, since the fuel content of the charge for the working cylinder would be unnecessary under usual firing conditions and would be more or less of a waste.

The present invention therefore pertains more particularly to that form of the broad invention wherein the fluid employed is of the carburetted type, and wherein delivery is made to the working, compression and suction cylinders, with the volume introduced varied in the respective cylinders, the maximum passing to the working cylinder, the minimum to the suction cylinder, and an intermediate amount to the compression cylinder.

Among the objects of the invention are, therefore, the provision of a starting mechanism for multicylinder internal combustion engines, wherein starting activities are provided by subjecting the working cylinder to the action of fluid under pressure and concurrently delivering to the suction and compression cylinders volumes of carburetted air adapted to be active as a charge for ignition purposes when the engine cycle brings the compression cylinder to the moment of firing the charge, the delivery of the carburetted air being under pressure, the volumes delivered being unequal in the several cylinders with the maximum delivery in the working cylinder, and the minimum delivery in the suction cylinder. Also to provide a starting mechanism in which the control of the ignition activity is provided as a part of the starting mechanism. In addition, the provision of a simple mechanism for producing these general results.

To these and other ends, the nature of which will be readily understood as the invention is hereinafter disclosed, said invention consists in the improved construction and combination of parts hereinafter more fully described, illustrated in the accompanying drawings, and more particularly pointed out in the appended claims.

In the accompanying drawings, in which similar reference characters indicate similar parts in each of the views—

Figure 4:
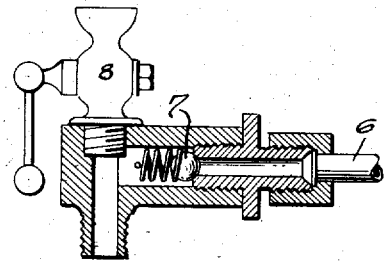
Fig. 4 is a section of one of the connections to a cylinder and illustrating a simple form of non-return valve structure.

1 indicates an air-tight receiver with a cover 2, which, in this particular form, is shown as provided with an air-carburetting mechanism presently described. The bottom or end of the receiver is shown as provided with four openings 5, spaced equi-distant from the center and at uniform distances from each other (90° apart), these openings forming entrances to individual passages or conduits 6 which are adapted to lead to and be connected with individual cylinders of the engine, the connections being such that successive openings 5 will be connected up to cylinders in the order of their firing in the cycle of operation of the engine; for instance, in Fig. 2, the arrangement is indicated by I, II, III, and IV, the first being to the cylinder then on its working stroke, the second to the cylinder then on its compression stroke, the third to the cylinder then on its suction stroke, and the fourth to the cylinder then on its exhaust or scavenging stroke. A non-return valve 7 is located within each connection 6, these valves being of any preferred type, Fig. 4 illustrating a convenient form, the purpose being to close a connection during periods when the pressure within the cylinder is greater than that within the connections; 8 indicates a test cock which may be utilized for testing purposes if desired.

Figure 2:
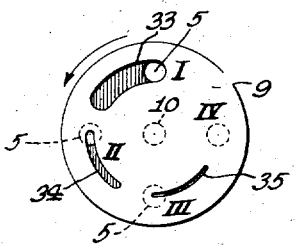
Fig. 2 is a face view of the distributing valve.

9 indicates a disc, driven by a spindle 10 and chain wheel 11 or other convenient means, at half the speed of the main shaft of the engine, said disc being provided with arcuate slots 33, 34 and 35, as shown in Fig. 2. The slots are shown as of substantially equal arcuate length but of different widths, slot 33 having a width substantially equal to the diameter of opening 5, slot 34 being of less width, and slot 35 of still less width. Since the disc is located within the chamber 50 directly over the entrances 5, it will be readily understood that communication between the chamber and any one of the connections 6 will be provided whenever either of the slots is in position to expose such entrance, so that during disc rotation each entrance will be rendered active with the chamber first during the period when slot 35 is active with it, followed by the activity of slot 34 and finally with the activity of slot 33, the disc being assumed to travel in the direction of the arrow in Fig. 2.

In this particular form of the starting mechanism the fluid for chamber 50 is that of carburetted air, this being provided by suitable mechanism shown as a fitting 51 carried by cover 2, and which is provided with a chamber 52 into which is discharged compressed air from a suitable source through a connection 3, the air providing the air component of the charge. The fuel content, which may be naptha or other suitable hydrocarbon, is delivered from a suitable source through pipe 15 into a chamber 53 of a fitting 54, a non-return valve 16 being provided to prevent back pressure activity within pipe 15. 17 indicates an adjustable conduit for the passage of fuel from chamber 53, the forward end of conduit 17 being located in the outgoing passageway from chamber 52, the structure being such that as air passes from chamber 52 into chamber 50, it will draw fuel from the conduit to carburet the air; the adjustment of valve 17 serves to control the area of the passageway for the air from chamber 52. Since chambers 50 and 52 are in open communication, it will be understood that when the entrances 5 are closed, the pressure in the chambers 50 and 52 will be substantially equal; when the slots provide communication with the entrances 5 the delivery of fluid from chamber 50 provides a reduction of pressure within chamber 50 and flow of air from chamber 52 becomes active to deliver additional carburetted air to the chamber to maintain the pressure.

With the chamber 50 supplied with the carburetted air it will be understood that the ports 33, 34 and 35 provide and control communication between such chamber and the conduits or passages 6 with which the respective ports may be co-operating. For instance, in Fig. 2, the opening I represents the cylinder which is on its working stroke, the valve being in the position in which the supply of the fluid through port 33 is approaching its close—a position in which the piston of the cylinder is approaching the end of its working stroke; opening II represents the cylinder undergoing compression, and port 34 is shown as having a similar relation to that cylinder; port 35 has a similar relation with opening III which leads to the suction cylinder. It will be understood, of course, from the direction of the arrow in Fig. 2, that such communication had been had for a period of time sufficient to move the valve to the position shown. As the valve continues its movement, port 35 will reach the opening IV, while ports 34 and 33 will reach openings III and II respectively, this condition being reached when the piston of the cylinder of opening II has passed its dead center position, the firing of the charge in cylinder II taking place within the period between the time when port 34 has left the entrance to the passage to cylinder II and the time when port 33 begins its activity with such cylinder. This position leaves opening I closed by the valve, so that no fluid is admitted to cylinder I while the latter is undergoing its exhaust or scavenging stroke.

In starting the engine, the valve is generally in position to place opening 5 of the working cylinder at an intermediate point in the length of the port 33—the engine generally stopping with the pistons at an intermediate point of the strokes. When starting is to take place, air is admitted through passage 3, producing the carbureted characteristic of the content of chamber 50, and passing to the respective cylinders through the open ports. Since the area of ports 34 and 35 is each less than that of port 33, it will be understood that the greater volume of fluid enters into the working cylinder, to exert its power on the piston of that cylinder; while the piston of the compression cylinder is to travel in the opposite direction, the admission of the charge thereto is of a less volume and hence builds up the cylinder pressure more slowly, so that an unbalanced condition in pressures is presented in the two cylinders, the result being that the piston of the working cylinder will be driven in the direction of the working stroke, thus completing the compression of the charge in the compression cylinder. At the same time, a still smaller volume of the fluid is being admitted to the suction cylinder, thus preparing that cylinder with a small volume of the fuel ready for the beginning of the succeeding compression stroke, the charge being completed during the latter stroke by the admission of the charge through port 34 which becomes active with the cylinder through movement of the valve as the engine turns over. As long as the pressure condition in cylinder 50 is maintained, this action in connection with the cylinders will continue, the cycle taking place with the cylinders in the order of the firing cycle of the engine; hence, the arrangement not only provides for starting the engine, but the starting period may be prolonged as long as the fuel and air components are supplied to the admixing point for producing the carburetted air of chamber 50.

In the foregoing, the operation can be had under the usual firing conditions, the initial power stroke being provided by the admission of the charge under high pressure conditions, the compression cylinder charge being then ignited. However, the arrangement permits the starting to be provided by the explosion of a charge in the working cylinder, through the use of the ignition mechanism to be described, the first explosion thus taking place in the working cylinder rather than in the cylinder which is the next in firing order, the starting pressure thus being provided by the explosion, and permitting the pressure of the compressed air to be reduced, the ignition herein disclosed, being advanced sufficiently to provide this result. The first explosion thus takes place with the engine standing still or only beginning to move; but the shock to even a large engine can be entirely controlled by adjusting the mixture of the feed screw 17 and by selection of the position the piston is to occupy when the spark is allowed to ignite the mixture.

Figure 1:
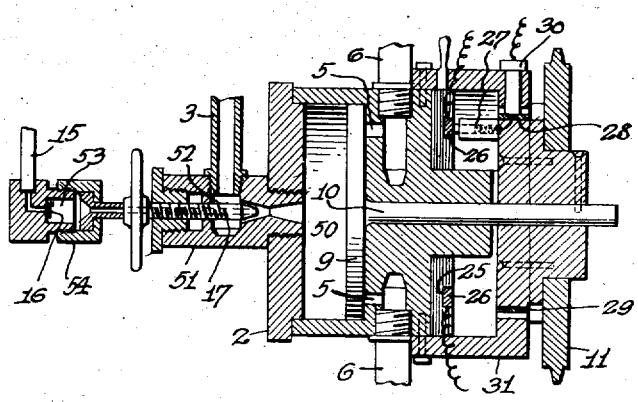
Figure 1 is a section taken centrally through a rotary distributing structure according to the present invention.
Figure 3:
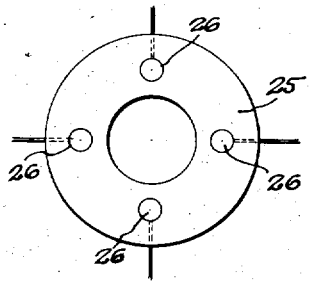
Fig. 3 is a detail view, in elevation, of the timing ring 25.

For the latter purpose the means shown in Figs. 1 and 3 may be employed where a vulcanized fibre or other insulating adjustable ring 25 is fixed to the back of the distributor. On this ring four metal buttons 26, placed at 90° apart and insulated from the body of the distributor, are connected one to each sparking plug in the cylinders either directly or through a coil. Contact fingers 27 on a member 28 rotating with but insulated from the disc 9 complete the circuit through a slip ring 29 on the periphery of the insulated disk 28 and the contact terminal 30. This commutator arrangement can be made for distributing either primary or secondary current as may be preferred, but the sparking should be maintained when starting the engine as long as the circuit is complete or it should take place when the circuit is completed and not only when this contact is actually made and broken; otherwise there would be no sparking when the engine was standing still and it would consequently fail to start. If the commutator be arranged for direct high tension distribution it may advantageously be enclosed by a fibre cover 31 to keep it clean. Once the engine has started and passed the first dead center point the spark can be advanced by moving the insulating ring 25 by means of the arm or handle 32 and so increase the speed. The distributing apparatus for the spark coil or magneto of the ignition system should be arranged to retard and advance the spark some 90° and to enable a spark to be produced even when the engine is standing still. Where the explosion takes places while the engine is standing still, the initial explosion is had in the explosion or working cylinder—represented by opening I in Fig. 2—by the use of the ordinary sparking mechanism or the adjustable sparking mechanism shown in Fig. 1. The explosion in cylinder I will carry the engine over the dead point, whereupon the charge of cylinder II will be ignited, and cylinder No. III will follow. Should No. IV cylinder fail to ignite after passing the dead point it receives the explosive mixture through the large port thus taking the place of the first cylinder and cylinder No. III will take the place of No. II. It is thus impossible for the engine to fail to start if everything is in order, and the adjustment can be made perfect and permanent.

A steel bottle 20 inches long by 4 inches in diameter, when filled with air at 140 lbs. pressure per square inch, will start a 20 H. P. automobile engine six or seven times, before refilling is necessary and this bottle together with a small air pump for keeping it filled can easily be carried on the chassis of a small automobile. The compressed air can also very conveniently be used for inflating the tires and blowing the horn.

From the foregoing description of the distributing means and its operation it will be apparent that the difference in the size of the ports or the relative periods during which they are open controls the volumetric flow of compressed fluid or explosive mixture to the cylinders in such manner that a great flow is admitted to the working cylinder than to the compression cylinder and a differential pressure in the different cylinders produced which results in an initial starting movement of the working piston without necessitating immediate firing in the working cylinder, said greater flow to the working cylinder effecting the further compression of the mixture admitted to the compression cylinder so that a highly compressed and efficient explosive charge results in the latter cylinder at the time of firing.

In the example shown, the pressure for both the larger and smaller ports is the same, the pressure feed being through the common pipe 3, the smaller volumetric charge to the compression cylinder being due to the smaller area of the ports, this difference in area obviously producing a variation in volume of fluid admitted per unit of time in the several cylinders being served concurrently.

To complete the starting equipment a pump may be employed with entirely automatic air control maintaining the air pressure in the air bottle at a constant pressure within very small limits, and this pressure can be regulated entirely at will within the working limits of the air pump. Since the claims of the present application do not reach to this particular feature, no specific disclosure of a mechanism for this purpose is disclosed herein; however, a disclosure of a construction adapted for the purpose is contained in the said patent above identified, to which reference can be had if desired.

Having thus described my invention, what I claim as new is:

1. In a device for starting and applicable to the operation of internal combustion engines, a distributing receptacle, means for supplying a carburetted fluid thereto with the fluid under compression therein, means in said receptacle for distributing a charge of the fluid into one cylinder and for concurrently admitting under pressure a smaller charge of the fluid into the cylinder next in firing order, and means associated with said distributing means for firing the charge of the latter cylinder.

2. A device as in claim 1 characterized in that the distributing means is operative to admit under pressure a still smaller charge of the fluid to the cylinder second in firing order concurrently with the admission of the fluid to the two cylinders which precede it in the firing order.

3. In a device for starting and applicable to the operation of internal combustion engines, a distributing receiver, means for supplying carburetted fluid under compression to said receiver, inlets individual to each cylinder, a rotary valve in the receiver for controlling the inlets, a port in said valve permitting admission of the carburetted fluid to the cylinders in sequence, smaller ports in said valve permitting concurrent admission of the carburetted fluid to the inlets of the cylinders next in progressive firing order, and means for rotating said valve.

4. In a device for starting and applicable to the operation of internal combustion engines, a distributing receiver, means for supplying carburetted fluid under compression to said receiver, fluid inlets to each cylinder, a rotary valve in the receiver for controlling the fluid inlets, a port in said valve permitting admission of fluid to the inlets of the cylinders in sequence, smaller ports in said valve permitting concurrent admission of fluid to the inlets of the cylinders next in progressive firing order, said smaller ports differing in area in decreasing progression in the direction of the cylinder most remote in the firing cycle.

5. In a device for starting and applicable to the operation of internal combustion engines, a distributing receiver, means for supplying carburetted fluid under compression to said receiver with the means controllable to regulate the degree of carburetion of the fluid, fluid inlets to each of the cylinders, a rotary valve in the receiver for controlling the fluid inlets, a port in said valve to admit fluid to the inlets in sequence, smaller ports in said valve to permit admission of fluid to the inlets of the cylinders next in progressive firing order, and means for rotating said valve.

6. A device as in claim 5 characterized in that the smaller ports differ from each other in area in decreasing progression in the direction of the cylinder more remote in the firing cycle, the ports being relatively positioned to produce smaller port activity within the period of activity of the main port.

7. In a device for starting and running internal combustion engines, a fluid receiver, means for supplying a carburetted fluid under compression to said receiver, fluid inlets to each cylinder, a rotary valve in the receiver for controlling the fluid inlets, ports in said valve permitting admission of fluid to the inlets of the cylinders in the sequence of the firing order, said ports differing from each other in area in decreasing progression in the direction of the cylinder more remote in the firing order, said ports being relatively positioned to provide concurrent admission of fluid to the cylinder which is on its working stroke, and to the cylinder which is on its suction stroke, the larger port being active with the cylinder which is on its working stroke, and means for rotating the valve.

8. In means for starting and running multi-cylinder internal combustion engines, wherein a starting fluid is made active with the cylinders in a predetermined cycle to produce the starting activity, valve mechanism to control the delivery of the starting fluid to the cylinders in accordance with such cycle, and means for delivering the fluid to the valve mechanism with the fluid under compression, said valve mechanism being arranged to deliver starting fluid to the working cylinder at a rate per unit of time such as to provide the volumetric flow required in producing the initial starting impulse, said mechanism also having port means active to deliver fluid to the cylinder undergoing compression and the cylinder undergoing suction activity, said port means being active in such delivery within the period of delivery of fluid to the working cylinder, said port means being arranged to admit a lesser volume of fluid to the compression cylinder than is delivered to the working cylinder during the period of activity of the latter cylinder and to admit a lesser volume of fluid to the cylinder undergoing suction activity than is delivered to the compression cylinder during the similar period, whereby the volume of fluid delivered to the compression cylinder is substantially less than the volume delivered to the working cylinder during the delivery period to the latter cylinder.

9. In means for starting multi-cylinder internal combustion engines, wherein fluid active in developing piston movement in cylinders of the engine is made active with the cylinders in a predetermined cycle to produce the starting activity, valve mechanism for controlling delivery and distribution of the fluid to the cylinders in accordance with such cycle, said mechanism including port means active to deliver such fluid concurrently to a plurality of cylinders successively active in the firing cycle and in unequal amounts in the several receiving cylinders, the volume delivered to the working cylinder being substantially greater than that delivered to the cylinder undergoing compression, and the volume delivered to the cylinder undergoing suction activity being substantially less than that delivered to the cylinder undergoing compression, the port means being arranged in such manner that the concurrent delivery of fluid to the several cylinders during each firing cycle stage is completed during the period of delivery of fluid to the cylinder active as the working cylinder of that stage.

10. Engine actuating means as in claim 9, characterized in that the valve mechanism movements are synchronized with movements of the engine in such manner that maintenance of fluid delivery during a plurality of successive stages of the cycle will produce running conditions of the engine, the port means activity with cylinders being such that the volumetric relation in delivery between the working cylinder and the compression and suction cylinders is maintained in each stage of the firing cycle, the compression cylinder in any one stage becoming active as the working cylinder in the succeeding stage with the suction cylinder becoming active as the compression cylinder of such succeeding stage.

In testimony whereof I affix my signature.

CHARLES FREDERICK HEYWOOD.